United States Patent
Corrain

(10) Patent No.: US 9,104,928 B2
(45) Date of Patent: Aug. 11, 2015

(54) METHOD AND APPARATUS FOR GENERATING A SYNCHRONIZATION SIGNAL IN A SCANNING SYSTEM

(75) Inventor: Gabriele Corrain, Bentivoglio (IT)

(73) Assignee: DATALOGIC IP TECH S.R.L., Lippo di Calderara di Reno (BO) (IT)

( * ) Notice: Subject to any disclaimer, the term of this patent is extended or adjusted under 35 U.S.C. 154(b) by 349 days.

(21) Appl. No.: 13/519,384

(22) PCT Filed: Dec. 30, 2009

(86) PCT No.: PCT/IT2009/000596
§ 371 (c)(1),
(2), (4) Date: Jun. 27, 2012

(87) PCT Pub. No.: WO2011/080777
PCT Pub. Date: Jul. 7, 2011

(65) Prior Publication Data
US 2012/0286146 A1    Nov. 15, 2012

(51) Int. Cl.
*G01D 5/36* (2006.01)
*G06K 7/10* (2006.01)
*G02B 26/12* (2006.01)

(52) U.S. Cl.
CPC ............ *G06K 7/10623* (2013.01); *G02B 26/12* (2013.01)

(58) Field of Classification Search
CPC .................. G06K 7/14; G06K 7/1404–7/1495
USPC ........... 250/231.17, 233; 235/462.01–462.49, 235/462.33, 462.38
See application file for complete search history.

(56) References Cited

U.S. PATENT DOCUMENTS

| | | | |
|---|---|---|---|
| 4,344,110 A | 8/1982 | Ruediger | |
| 5,712,719 A | 1/1998 | Hama | |
| 6,204,938 B1 | 3/2001 | Horiuchi et al. | |
| 6,268,600 B1 | 7/2001 | Nakamura et al. | |
| 6,525,309 B1 | 2/2003 | Runge et al. | |
| 2009/0206161 A1 | 8/2009 | Olmstead | |

FOREIGN PATENT DOCUMENTS

| | | |
|---|---|---|
| DE | 1219267 B | 6/1966 |
| DE | 19831607 A1 | 7/2007 |
| EP | 0806690 A2 | 11/1997 |
| EP | 0967458 A2 | 12/1999 |
| WO | WO2005/109071 A1 | 11/2005 |

OTHER PUBLICATIONS

International Search Report dated Sep. 8, 2010 in Corresponding International Application No. PCT/IT2009/000596, 3 pages.
Office Action issued on Jun. 16, 2014 in corresponding European Patent Application No. 09820071.0.

*Primary Examiner* — Renee D Chavez
(74) *Attorney, Agent, or Firm* — Duane Morris LLP

(57) ABSTRACT

A scanning system includes a synchronizing arrangement including a light guide and a photosensor. The light guide directs a light beam to a photosensor, wherein light is deflected by one or more moving elements in the scanning system into a scanning region. The light guide has a light entry region, a reflecting region for reflecting light entering the light entry region and one or more light exit faces, so that light entering the light guide through the light entry region is at least partly reflected in the reflecting region and exits through one of the exit faces. The shape and the properties of the light guide are such that for two pencils of light rays, a first pencil of light rays is spaced from the second pencil and is non-overlapping with said second pencil of light rays.

12 Claims, 7 Drawing Sheets

METHOD AND APPARATUS FOR GENERATING A SYNCHRONIZATION SIGNAL IN A SCANNING SYSTEM

BACKGROUND AND SUMMARY OF THE INVENTION

The present invention relates to scanning systems, wherein a light beam is swept over a certain region in space. The invention particularly relates to scanning systems, wherein the light reflected from objects in this region is detected in the scanning system. The present invention especially relates to optical code readers, wherein an optical code is identified by sweeping a light beam, especially a laser beam, over an optical code, such as a barcode, or a part thereof and detecting and evaluating the light reflected from the code.

Typically, in such scanning systems a light beam originating from a stationary light source is reflected by a deflection system, which comprises one or more movable optical elements, which, due to their movement, reflect the light from said light source in different directions, depending on the position of said optical elements at the time when the light impinges on said optical element or elements. In one type of scanning systems to which the invention relates the light beam is reflected by a deflection system comprising a polygonal wheel, which has a plurality of reflecting surfaces at its side, typically a plurality of mirrors, especially flat mirrors, and which rotates around an axis perpendicular to its main surface, driven by a motor. Light impinging from said light source on one of the reflecting surfaces at the side of this polygonal wheel will be deflected in different directions, depending on the angle at which the light beam impinges on one of said reflecting surfaces for a given angular position of the polygonal wheel. In this way the light beam periodically moves along a line. In case of a flat reflecting surface or mirror it will move in a plane, also called scanning plane. If the surface of said surface is parallel to the rotation axis, the scanning light beam forms a scanning plane perpendicular to the rotation axis. In another type of scanning system considered in this invention, the deflection system comprises a mirror oscillating or rotating around an axis, which axis may be perpendicular to the scanning plane.

Within a scanning plane, a scanning range is defined as that part of the plane traversed by the light beam during the movement of the movable optical elements in the deflection system. Typically, the scanning region has the shape of a sector defined by two straight lines intersecting in the scanner and including a non-vanishing angle between them. This angle depends on the size of the reflecting surfaces of the polygonal mirror or, in case the polygonal mirror forms a regular polygon with equal sides, on the number of mirrors. In an embodiment with an oscillating mirror it depends on the oscillation amplitude. In case of a rotating mirror a light screen may block the emission of light for certain directions and thus limit the emitted light to a certain angular range. On a given surface outside the scanning device or, more generally, the part of the scanning system emitting the light, e.g. a plane perpendicular to the scanning plane at a certain distance from the scanning device, the moving scanning beam defines a line, which will be referred to as scanning line hereinafter. If the scanning beam crosses an object or code, a scanning line or part thereof is typically visible.

Especially for optical code readers one has typically one or more scanning lines crossing a code during reading. Optical code readers creating a plurality of scanning lines on an object surface may create the plurality of lines by virtue of reflecting surfaces at the side of a polygonal wheel, which are tilted at different angles to the plane perpendicular to the rotation axis of the polygonal wheel.

In an optical code reader, light that is diffusely reflected by the surface on which the optical code is placed is received by the code reader, which typically comprises a light-concentrating optical system. This light-concentrating optical system may include a lens or a concave mirror in the focal point of which a sensor is placed, on which the reflected light returning to the optical code reader is focused. The sensor converts the received light into an electric signal. The modulation of this electric signal, as the light beam sweeps over the code, is representative of the variation of reflectance of the surface along the scanning direction. If a code is crossed by a scanning line, the presence of this code leads to a particular modulation pattern of the electronic signal rendered by the sensor, which can be recognized and decoded by an electronic signal processing system.

In order to evaluate the signals of the sensor, it is important to know when a scan is started, i.e. when the light beam starts sweeping over the scanning region. For example, when the light beam repeatedly crosses the optical code it is necessary that the electronic signals generate every time the beam crosses the code are processed individually. Additionally, it is frequently necessary to establish the position of the light beam on the scanning line at the time of reading, e.g. in optical code readers which are capable to read optical codes only partially intercepted during each scan. This position may be derived from the time of measurement and the time when the light beam was at the start of the scanning line, knowing the speed of the polygonal wheel. In both instances a synchronization of the electronic signal with a predefined position of the light beam on the scanning is necessary.

Similar problems arise when the scanning system is used to detect objects in the scanning region by directing light reflected from the scanning region to a photosensor in the scanning system and to evaluate the signals created by the photosensor. However, synchronization is also important in scanning systems where the reflected light is not detected. These may, for example, be scanning systems for laser engraving, laser etching, laser marking or other applications, where material is removed or modified by moving light, especially a laser beam, over an object.

One possible way to achieve synchronization is to detect a predefined position of the light deflecting element in the deflection system, which typically corresponds to an edge of the scanning region, e.g. by means of an optical sensor comprised of an emitter and a receiver, which generates a synchronization signal when the element is in said predefined position. A problem with this approach is that the positioning of the emitter and receiver of said optical sensor is critical when manufacturing the code reader.

Another way of synchronizing an electronic signal, e.g. the signal created by received reflected light, with the movement of the emitted light beam is to intercept the emitted light beam with a photosensor that is placed at the edge of the scanning region. When the light beam hits this photosensor, a synchronization signal is generated, which indicates the start (or the end) of the scan. As an alternative to directly receiving the light beam by such a photosensor, it is known in the art to redirect the light beam at the edge of the scanning range to the photosensor via a mirror or another reflecting surface.

In this kind of arrangement it is important that the effective scanning range, i.e. the effective range of angles at which the light beams are emitted in the scanning plane, is not significantly limited. This implies a precise positioning of the photosensor and associated optical elements in the synchronizing arrangement. The photosensor itself needs to be connected to other electronic components, which are typically mounted on a circuit board spaced from the scanning plane. In order to accommodate this photosensor, it was proposed to use a circuit board arranged perpendicular to other circuit boards in a scanning device. However, this is more difficult to assemble in an accurate way and increases the dimensions of a scanning device, since this additional circuit board has to be outside the scanning range. If an additional mirror is used to redirect the light from the scanning plane to the photosensor, an additional support for the mirror is necessary, which again complicates the design.

In EP 0 967 458 A2 it is proposed to redirect the light from the scanning plane to the photosensor by means of a plate of a light transmitting material. This plate is arranged in such a manner that the light enters a small side of the plate, when the scanning beam is at the edge of the scanning range, is reflected at another small side and finally exits the plate at a further small side to impinge on the photosensor, which is arranged adjacent to this last-mentioned small side. Typically this plate extends perpendicular to the scanning plane. Due to the small thickness of a plate, this solution has the drawback that the plate has to be aligned with great accuracy with the direction of the scanning beam at the edge of the scanning range, where the beam used for synchronizing is detected.

For an efficient manufacture of scanning systems, especially optical code readers, with different properties, one typically tries to use a standard construction for all code readers in which, to the extent possible, the constituent parts are the same or standardized in such a way that they can be easily exchanged for each other. Different optical code readers in one series frequently have polygonal wheels with a different number of reflecting faces. This implies that the length of the reflecting faces, i.e. the dimension in the circumferential direction, and the angle between these faces varies. Consequently, in an arrangement wherein the light reflected from the polygonal wheel is redirected by an optical element to the photosensor, according to the prior art both the position of the redirecting element and the photosensor need to be shifted, depending on the polygonal wheel used in the respective scanner. With the arrangement proposed in EP 0 967 458 A2 it is therefore necessary to provide a plurality of very precisely aligned positions of the circuit board where the sensor and the light transmitting plate are to be mounted. A further complication arises when the faces of the polygonal wheel have different inclinations to a plane perpendicular to the axis of rotation in order to create a plurality of scanning lines. If a redirecting optical element is used the scanning beam will have different incident angles, depending on the face at which the light beam was reflected. In the device according to EP 0 967 458 A2 this has the consequence that the exit point in the plate will vary, depending on the face of the polygonal wheel at which the light beam was reflected. Thus, the photosensor needs to have a relatively big size in order to be able to deliver a synchronizing signal for each start of a scanning line.

The problem underlying the present invention is to provide a light guide for a scanning system as described above, which allows for clearly defined exit points for rays incident at different locations of the light guide and/or at different angles of incidence, to provide a related scanner and ultimately to facilitate the manufacture of such scanners.

According to one aspect, the present invention provides a light guide for directing a light beam to a photosensor in a scanning system, wherein light is deflected by one or more moving elements in the scanning system into a scanning region outside a scanning device or outside the part of the scanning system emitting the light, especially for directing a light beam to a photosensor in a scanning system or scanning device, wherein light reflected from the scanning region to the scanning device or scanning system is detected, wherein said light guide has a light entry region, a reflecting region for reflecting light entering the light entry region and one or more light exit faces, so that light entering the light guide through the light entry region is at least partly reflected in the reflecting region and exits through one of the exit faces, which is characterized in that the shape and the properties, especially reflective and/or refractive properties of the light guide are such that for two pencils of light rays, which enter the light guide through the light entry region, are reflected in the reflecting region and leave the light guide through a light exit face in a respective exit zone, wherein of the two light pencils a first pencil of light rays is spaced from the second pencil and is non-overlapping with said second pencil, said first and second pencil of light rays are directed to different light exit faces of the light guide or have identical or at least overlapping exit zones in the same exit face.

The light entry region may consist of one or more light entry faces. Likewise, the reflecting region may consist of one or more reflecting faces of a light guide. In an alternative embodiment the reflection region may be constituted by a region of the light guide where the surface of the light guide is covered with a reflecting material. In this embodiment, the light entry region may be considered as that region of the light guide through which light may enter the light guide to be reflected in the reflecting region so as to leave the light guide through a light exit face, wherein the reflecting region is typically at the top or close to the top of the light guide, whereas the light exit face is typically at the side diametrically opposite to the top of the light guide and typically is or forms a part of the bottom surface of the light guide.

According to the present invention, a clearly defined exit point is achieved by shaping the light guide in such a manner that if light is incident on the light guide at a different location of the light entry side or at a different angle, as compared to a basic configuration of the scanning system, as may result from replacing a polygonal wheel or other optical elements of said basic configuration, the light will nevertheless be guided to the same exit face and thus the same exit point or it will be guided to a separate exit face, which again provides an exit point that is defined in such a manner that it can be easily aligned with a photosensor during manufacture.

The invention may provide that the shape and the reflective properties of the light guide are such that a first light ray, which enters the light guide perpendicularly to the light entry region, especially a light entry face, and a second light ray, parallel to the first light ray, entering the light guide through the light entry region, especially through the same or another light entry face of the light entry region, each have an optical path through the light guide to a light exit face, wherein at least a part of the optical path of the first ray is non-parallel to the optical path of the second ray.

The exit face to which the first ray is guided in the light guide can be the same as or different from the light exit face to which the second ray is guided.

For the sake of clarity, a reference to light rays with regard to the light guide may or may not refer to light rays that actually occur in a scanning system. In the preceding text passages, reference was made to light rays to describe optical properties of the light guide by reference to possible optical paths through the light guide, irrespective of whether in an actual scanner all rays referred to will actually occur during operation.

According to a preferred embodiment the one or more exit faces are located at the bottom side of the light guide. The invention may provide that the reflecting region is provided at the top side of the light guide, i.e. the side opposite the bottom side, or is adjacent to the top side of the light guide. In the latter embodiment the reflecting region may extend to a top edge, but may also be spaced from a top edge, although being close to it, especially closer to it than to the bottom side.

The invention may provide at least a partial region of a light entry region, especially of one or more light entry faces is curved, preferably convexly curved, especially cylindrically curved. The term "cylindrical" is used in a general sense and may especially refer to curved surfaces that form part of the surface of a cylinder generated by an elliptical generating line.

It may especially be provided that the light entry region comprises or consists of two adjacent curved light entry faces, preferably outwardly or convexly curved regions.

The invention may provide that the light entry region comprises or consists of two outwardly curved faces, which meet at a common edge.

The invention may provide that the light entry region or one or more light entry faces of the light guide are flat.

The invention may provide that the light guide comprise at least two exit faces located at the bottom side of the light guide, which are separate from each other, and one or more reflection sides at the top side of the light guide, such that a ray or group of rays incident on the light entry region, especially on a light entry face, is directed to a first of said two exit faces and a second, different ray or group of rays incident on the light entry region, especially on the same or a different light entry face, is directed to the second of said two exit faces.

According to one aspect, the present invention provides a light guide for directing a light beam to a photosensor in a scanning system, wherein light is deflected by one or more moving elements in the scanning system into a scanning region outside a scanning device or the part of the scanning system emitting the light, especially in a scanning system or scanning device, wherein light reflected from the scanning region to the scanning device or scanning system is detected, wherein said light guide has one or more light entry faces, one or more reflecting faces for reflecting light entering a light entry face and one or more light exit faces, so that light entering the light guide through a light entry face is at least partly reflected at one of the reflecting faces and exits through one of the exit faces, characterized in that the light guide comprise at least two exit faces located at the bottom side of the light guide, which are separate from each other, and one or more reflection sides at the top side of the light guide, such that a ray or group of rays incident on the light entry face is directed to a first of said two exit faces and a second, different ray or group of rays incident on the light entry face is directed to the second of said two exit faces. Embodiments of a light guide according to this aspect may comprise any other feature of a light guide as described herein.

The invention may provide that the two exit faces meet at a common edge. It may also provide that the two exit faces do not have a common edge.

The invention may provide that the first light exit face is spaced from the second light exit face in the direction from the bottom to the top of the light guide.

Said invention may provide that the light guide comprises a protruding portion at one of its sides and one of said two exit faces is at the bottom side of said protruding portion, whereas the second of said two exit faces is outside said protruding portion.

Said second exit face can, for example, be located at the bottom of a main body of the light guide or located at the bottom of a second protruding portion of the light guide.

In an embodiment with such a protruding portion at a side of the light guide the light guide may have a secondary reflecting surface for reflecting light reflected in said reflecting region into said protruding portion of the light guide.

It may especially be provided that the protruding portion has a reflecting surface for reflecting light entering the protruding portion to said light exit face of said protruding portion.

It may be provided that the secondary reflecting surface is parallel to the reflecting surface of said protruding portion.

The invention may provide that the reflecting region comprises or consists of one or more reflecting faces. When the reflecting region comprises or is constituted by a plurality of reflecting faces, these reflecting faces may be adjacent to each other in a specific embodiment of the invention.

The invention may provide that the reflecting region consists of a reflecting face at the top of the light guide, which extends over the entire width of the light guide.

The width is to be understood as the dimension of the light guide orthogonal to the longitudinal direction, which leads from the top to the bottom of the light guide, and along the light entry side of the light guide.

The invention may provide that a reflecting face is curved and follows an elliptical curve in a cross-section of the light guide perpendicular to this reflecting face.

The invention may provide that a reflecting face is part of the surface of an ellipsoid, especially a ellipsoidal surface with cylindrical symmetry.

In the above-mentioned embodiments the reflecting surface is preferably a surface reflecting in a directed manner, i.e. a surface that is not or to a little extent diffusely reflecting. A reflecting surface as mentioned herein can e.g. be a partially reflecting surface, such as an interface between two media with different refractive index, a surface reflecting by total internal reflection or a surface provided with a reflective coating.

The invention may provide that the light guide or the main body of the light guide has the shape of a four-sided geometrical body, wherein the sides may be flat or curved and in addition to said four sides the light guide or its main body has one or more top surfaces and one or more bottom surfaces, which may be flat or curved.

The invention may provide that the cross section of the light guide diminishes from bottom to top.

In one embodiment the light guide or the main body of the light guide has the general shape of a four sided truncated pyramid. Deviations from said general shape may e.g. include that one or more of the sides are curved and/or that the top face of said truncated pyramid is not parallel to its bottom face and/or curved.

The invention may provide that the light guide comprises a protruding portion that has the shape of a cone or a truncated cone, wherein the diameter of said cone or truncated cone diminishes from bottom to top and the top of said cone or truncated cone forms the top of the light guide.

Whereas in a preferred embodiment a protruding portion in the shape of a truncated cone is used, a protruding portion in the shape of a cone can also be used. Whenever reference is made herein to a cone or to a truncated cone, respectively, it is to be understood that the respective other alternative is meant as well or mutatis mutandis. Alternatively the protruding portion may also have the shape of any body that has a discrete or continuous rotational symmetry with regard to a central axis, e.g. a pyramid or a truncated pyramid, especially with four or more side faces.

According to one aspect of the present invention, the present invention provides a light guide for directing a light beam to a photosensor in a scanning system, wherein light is deflected by one or more moving elements in the scanning system into a scanning region outside a scanning device or that part of the scanning system emitting the light, especially a scanning system or scanning device, wherein light reflected from the scanning region to the scanning system or scanning device is detected, wherein said light guide has a light entry region, a reflecting region for reflecting light entering the light entry region and one or more light exit faces, so that light entering the light guide through the light entry region is at least partly reflected in the reflecting region and exits through one of the exit faces, which is characterized in that the light guide comprises a protruding portion that has a discrete or continuous rotational symmetry with regard to a central axis, e.g. in the shape of a cone ore a truncated cone, a pyramid or a truncated pyramid, e.g. with four or more side faces. In one embodiment according to this aspect the diameter of said truncated cone diminishes from bottom to top and the top of said cone or truncated cone forms the top of the light guide. Said the protruding portion may especially comprise a diffusely reflecting stripe at its side. Preferably, said stripe essentially extends along a plane including the symmetry axis of said protruding portion. Embodiments of a light guide according to this aspect may comprise any other feature of a light guide as described herein.

The invention may especially provide that said portion in the shape of a truncated cone extends from the top surface of a base portion, wherein the symmetry axis of said truncated cone is preferably perpendicular to said top surface, which is preferably flat.

The invention may provide that the protruding portion comprises a diffusely reflecting stripe at its side, which diffusely reflects light within the light guide incident on the surface of the light guide from inside.

The invention provides in a preferred embodiment that said stripe essentially extends along a plane including the symmetry axis of said truncated cone.

The invention may provide that the reflecting stripe extends to the top. In a cross-section perpendicular to the symmetry axis of the truncated cone, the dimension of the stripe in the circumferential direction is smaller, preferably considerably smaller than the circumference of the truncated cone. The invention may provide that in a cross-section perpendicular to the symmetry axis of the truncated cone, the reflecting strip covers a portion of the circumference corresponding to an arc defined by an angle greater than 0° and less than or equal to 180°. In preferred embodiments the reflecting stripe covers a portion corresponding to an angle different from zero and less than or equal to 20° in said cross-section. In a specific embodiment the angular extent is about 10°. Generally, the exact value depends on the index of refraction of the material. The typical diameter of the cross section is in the order of 3 millimeters.

The invention may provide that said protruding portion comprises a groove and the reflecting stripe is provided by diffusely reflecting material in said groove, e.g. by covering the surface of the light guide or by being provided in a surface region of the light guide.

A light guide according to the present invention may comprise at least two legs at the bottom side thereof for insertion into corresponding holes in an electronic circuit board.

The invention may provide that said legs extend from the bottom surface of a base portion of the light guide.

This bottom surface is preferably flat and the legs are preferably orthogonal to said bottom surface. Preferably, said base portion has a top surface and a bottom surface which are parallel to each other and generally has the shape of a plate.

According to another aspect the invention provides a scanning system, especially an optical code reader, comprising at least one light source, especially a laser light source, and light deflection means for consecutively directing light in different directions, comprising at least one moving optical element, especially an optical element driven by a motor to perform a periodic movement, for receiving light from the light source and directing said light in different directions in accordance with the movement of the element, said scanning system comprising a synchronizing arrangement comprising a light guide as described herein and a photosensor, said light guide being arranged so that when said moving optical element is in a predetermined position, light deflected by said moving optical element is received at the light entry region of said light guide and directed to a light exit face of the light guide, wherein the photosensor is arranged to receive light emerging from said light exit face so as to render an electric signal when said moving optical element is in said predetermined position, wherein said electric signal is used for synchronising signals with the movement of a light beam emitted by the scanning system.

Said moving optical element can especially be a polygonal wheel with reflecting faces at its side, but can also be a rotating or oscillating mirror. Preferably the movement of said optical element is periodic. The optical element may be a specularly reflecting and/or refracting optical element.

The invention may provide that the light guide is shaped to focus the light leaving said moving optical element on the light sensitive area of said photosensor, when said moving optical element is in said predetermined position.

The invention may provide that the light guide comprises a curved reflecting surface for internally reflecting light entering into the light guide, wherein the light guide and the photosensor are arranged with regard to the moving optical element such that in a plane comprising the light beam leaving the moving optical element in said predetermined position and intersecting the light sensitive area of the photosensor, which is not located on the line of said light beam, said curved reflecting surface is part of an ellipse, the point where the light beam leaves the moving optical element coincides with a first focal point of said ellipse and the second focal point of said ellipse is in or close to the light sensitive area of said photosensor.

The photosensor is typically located below the point where the deflected light beam leaves the moving optical element, in case of a rotating optical element in a plane spaced from said point in the direction of the rotation axis of the movable element.

The invention may provide that the scanning system comprises a light guide which comprises at least two exit faces located at the bottom side of the light guide, which are separate from each other, and one or more reflection sides at the top side of the light guide, such that a ray incident on the light entry region, especially on a light entry face, is directed to a first of said two exit faces or to the second of said two exit faces after reflection in the reflecting region, especially at a reflection face, depending on the location where the ray is incident and/or the angle of incidence of the ray at the light entry region or a light entry face, respectively, wherein the light guide is arranged in such a way that the light incident from said moving optical element in said predetermined position exits the light guide through one of said two exit faces, wherein said photosensor is arranged to receive light from this exit face.

The invention may especially provide that the photosensor is located below said exit face.

The invention may provide that the light guide and the photosensor are mounted on an electronic circuit board, wherein the light guide can be mounted in an alternative position determined by mounting means of the electronic circuit board, wherein in said alternative position of said light guide the photosensor is arranged to receive light from the other of the two light exit faces.

The invention may provide that the position of the photosensor on the electronic circuit board is fixed, said light guide comprises at least two legs which are inserted into mating holes of the electronic circuit board, wherein the photosensor is located below one of said two exit faces, said circuit board comprising one or more additional, unoccupied holes mating the legs of the light guide, such that the legs of the light guide can be mounted into holes of the circuit board, including one or more of said additional holes, in such a way that the photosensor is located below the other light exit face of the light guide.

The invention may provide that the light guide comprises a protruding portion that has the shape of a truncated cone, wherein the diameter of said truncated cone diminishes from bottom to top and the top of said cone forms the top of the light guide. Said protruding portion may especially comprise a diffusely reflecting stripe at its side. Preferably, said stripe essentially extends along a plane including the symmetry axis of said truncated cone.

Also in this embodiment it may be provided that the photosensor and the light guide are mounted on an electronic circuit board and the light guide comprises at least two legs which are inserted into mating holes in the electronic circuit board.

The invention may provide that the circuit board comprises a plurality of holes the number of which is larger than the number of the legs of the light guide, said holes being arranged in such a way that the light guide can be mounted in a plurality of positions resulting from a rotation of the light guide around the symmetry axis of the protruding portion.

The invention may provide that the light guide is removable from the holes after mounting, but also so that the light guide is permanently fixed in the position determined by the holes in which the legs are mounted.

According to a further aspect the invention provides a method of manufacturing a scanning system as described herein, characterized by the following steps:
  providing a light guide as described herein, said light guide having means for mounting it on an electronic circuit board,
  providing an electronic circuit board, said electronic circuit board comprising means for receiving the light guide in a plurality of predetermined positions,
  mounting a photosensor on said electronic circuit board,
  mounting the light guide in a selected one of said positions using said mounting and receiving means, said position being selected such that the light entry region of the light guide receives light deflected from said moving optical element, when said moving optical element is in said predetermined position, and the photosensor is located below that light exit face where the light deflected by said moving optical element and incident on the light entry region leaves the light guide, when the light guide is in said selected position.

The invention may provide that the light guide comprises at least two legs to be inserted into mating holes of the electronic circuit board, the number of holes in the electronic circuit board being larger than the number of legs of the light guide, the holes in the electronic circuit board being arranged in such a way that there are at least two different groups of holes, each of said groups corresponding to a different position of said light guide, when the legs are inserted into the holes of the respective group, characterized by the steps of:
  selecting a group of holes defining one of a plurality of positions of the light guide,
  inserting the legs of the light guide into the holes of said group, thereby mounting the light guide in said predetermined position.

The invention may provide that at least some of the plurality of positions result from a rotation of the light guide around a rotation axis.

Using this method a light guide having a protruding portion with the shape of a truncated cone can be mounted in different positions that are generated by rotation around the symmetry axis of said protruding portion. In this way it can be achieved that the reflecting strip is oriented so that it is opposite, especially diametrically opposite, to the region where the light deflected by the movable optical element is incident, when said movable optical element is in said predetermined position.

The invention may provide that the construction of the scanning system uniquely defines an axis of rotation of the movable optical element and allows mounting different rotating optical elements, and the method comprises the following steps:
  selecting one of a predetermined set of movable optical elements,
  selecting said position of the light guide such that the light deflected from the selected movable optical element is received by the light guide and directed to the photosensor, when said movable optical element is in a predetermined position.

A scanning system according to the present invention can especially be an optical code reader or a device or system for determining the distance of objects reflecting the emitted light in the scanning region. Generally, the invention is applicable for any scanning system, wherein a light beam is periodically emitted in different directions and there is a need to establish a temporal relationship between the emitted light beam and electronic signals, e.g. signals created by an electrooptical converter from reflected light. Whereas the invention will be largely explained with reference to scanning systems, wherein light reflected from the scanning region is detected and evaluated, a scanning system according to the present invention does not necessarily involve the detection of reflected light. Possible applications are, for example, scanning systems for laser etching, laser engraving or cutting or laser marking.

BRIEF DESCRIPTION OF THE DRAWINGS

The invention is further explained with reference to exemplary embodiments of the inventions with reference to the schematic drawings of FIGS. 1 to 6.

In the drawings, the same reference elements are used for the same or the similar elements.

DETAILED DESCRIPTION

Figure 1:
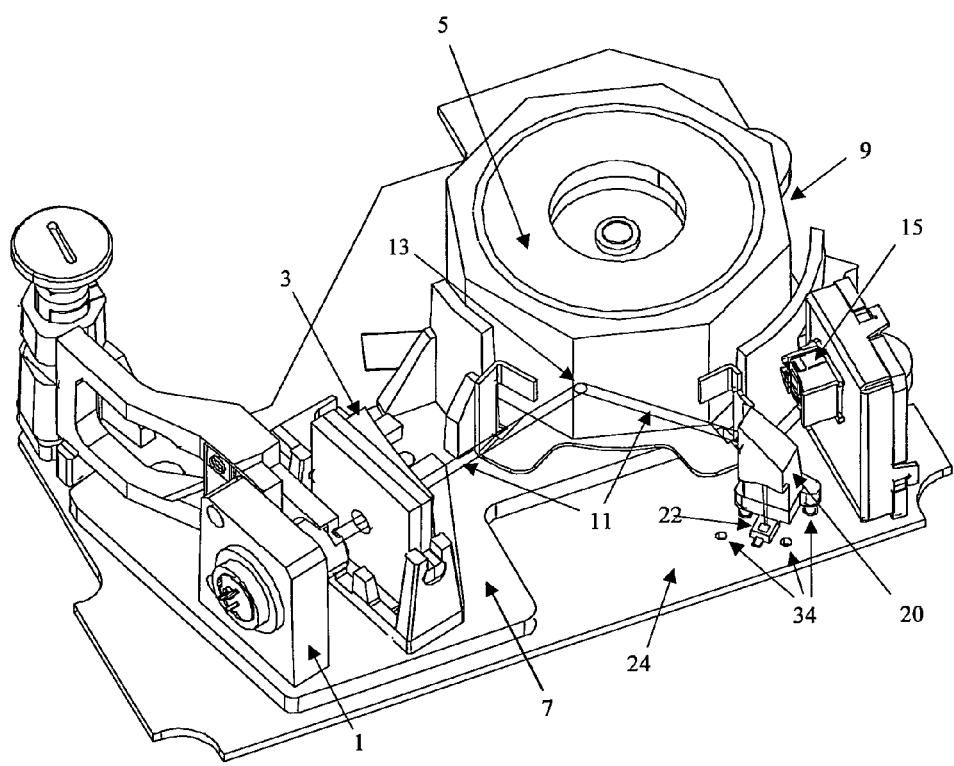
FIG. 1 shows a perspective view of the scanning and synchronizing arrangement of a scanning device according to the present invention.

FIG. 1 shows an exemplary embodiment of an optical code reader according to the present invention with a first embodiment of a light-directing element according to the present invention. In FIG. 1 a light source 1, a light concentrating optical system 3 and a polygonal wheel 5 are mounted to a mounting plate 7, which carries the optical components of the device. The polygonal wheel 5 comprises a plurality of flat mirror surfaces 9, which are parallel to the axis of rotation of the polygonal wheel 5. The light beam 11 originating from the light source 1 impinges on the polygonal wheel 5 at incidence point 13, which is essentially static in a fixed coordinate system, e.g. a coordinate system defined with regard to mounting plate 7, but moves along the faces 9 when the wheel is rotating. As the angle of incidence on the mirror surface 9 changes while a mirror face 9 is passing, the light beam reflected from a mirror face 9 sweeps over or scans a range of angles, while the wheel 5 is moving, and thus produces as scanning line on the object it impinges after leaving the scanning device. This range of angles is limited by those angles at which the light is reflected at the leading and trailing edge of each face in the direction of movement of the polygonal wheel. The angles themselves may e.g. be defined with regard to the original direction of light beam 11 incident on the polygonal wheel. As the mirror faces 9 are identical, the range of angles and thus the scanning region in space that is swept by the light beam reflected from each face is identical and thus an object in the scanning region is swept successively by the light beams reflected from successive mirror faces 9, each of these faces creating its own scanning line or scan. A detector for light reflected from objects in the scanning range is indicated at 15.

In order to determine the start of each scan, a synchronizing arrangement is provided, which consists of a light guide 20 and a photosensor 22. The light guide 20 and photosensor 22 are mounted on an electronic circuit board 24, which also carries other electronic components of the optical code reader and is positioned below the mounting plate 7. Details of the light guide 20 can be best seen in FIGS. 2a to 2c.

The light guide 20 comprises a transparent base portion 30, having a top surface and a bottom surface parallel to the top surface and three legs 32 extending downwards from the bottom surface, which in turn are inserted in holes 34 provided in the electronic circuit board 24. It will be readily appreciated that by providing three appropriately spaced holes 34 according to the pattern of legs 32 both the position and the orientation of the light guide 20 are uniquely defined, once its legs 32 have been inserted into these holes 34. One recognizes in FIG. 1 that there are additional holes 34 which are not occupied by legs 32 in the arrangement shown in the drawings. These are provided to make it possible to mount the light guide 20 in a predefined alternative position and orientation, as may be appropriate if the polygonal wheel 5 is exchanged for another polygonal wheel with a smaller or larger number of reflecting mirror surfaces 9.

From base portion 30 upwards extends the main body of the light guide. It comprises two cylindrically curved input faces 36a and 36b, which meet at line 38, thereby defining a left portion 40a and a right portion 40b of the main body. Common to both portions 40a and 40b is an elliptically curved reflecting surface 42, which extends over the entire top back portion of the light guide, which can be best seen in FIG. 2c. The left portion 40a ends flush with the base portion 30, the line 38 forming the front right edge of this left portion 40a. The right part 40b protrudes over the base portion 30 and is cut off at a cylindrical surface 43 at a certain distance from the base portion. As can be seen in FIG. 2c, the main body may extend into a recess of base portion 30 and rest on the top surface of base portion 30 with an edge out of its side.

Figure 2A:
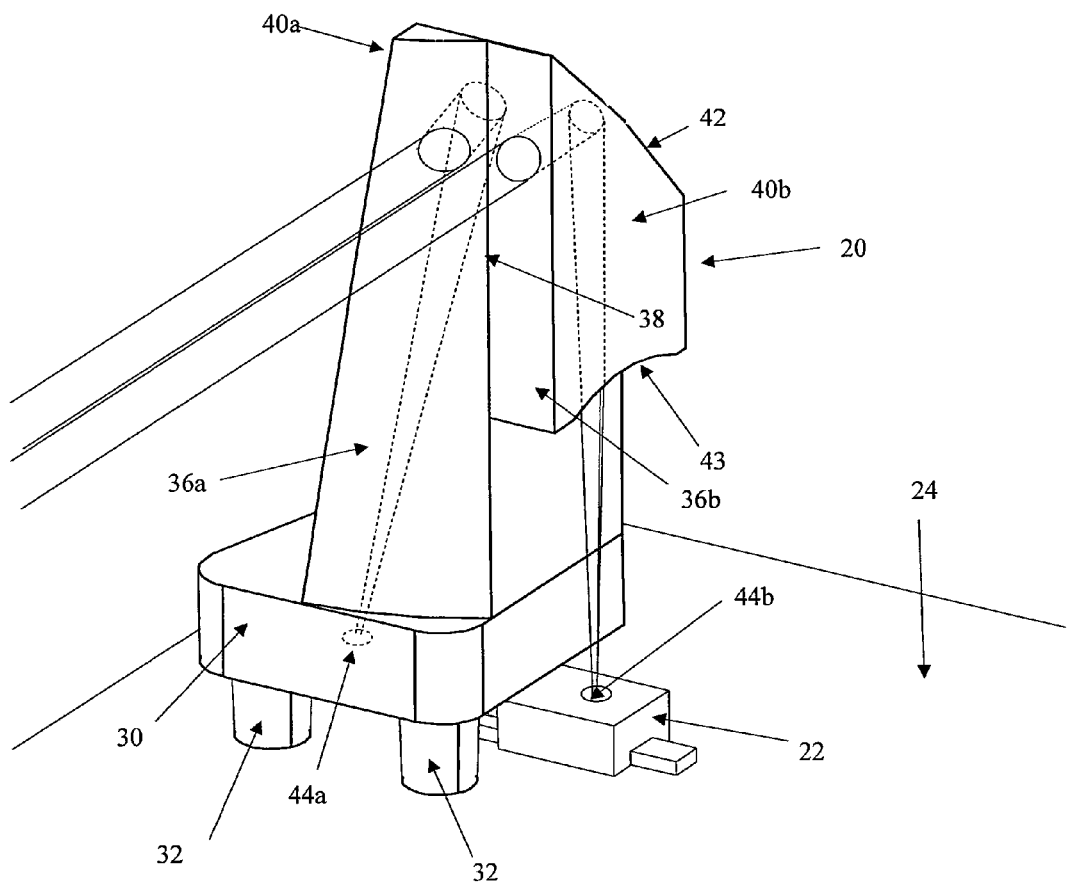
FIGS. 2*a* to 2*c* show a light guide according to a first embodiment of the present invention.
Figure 2B:
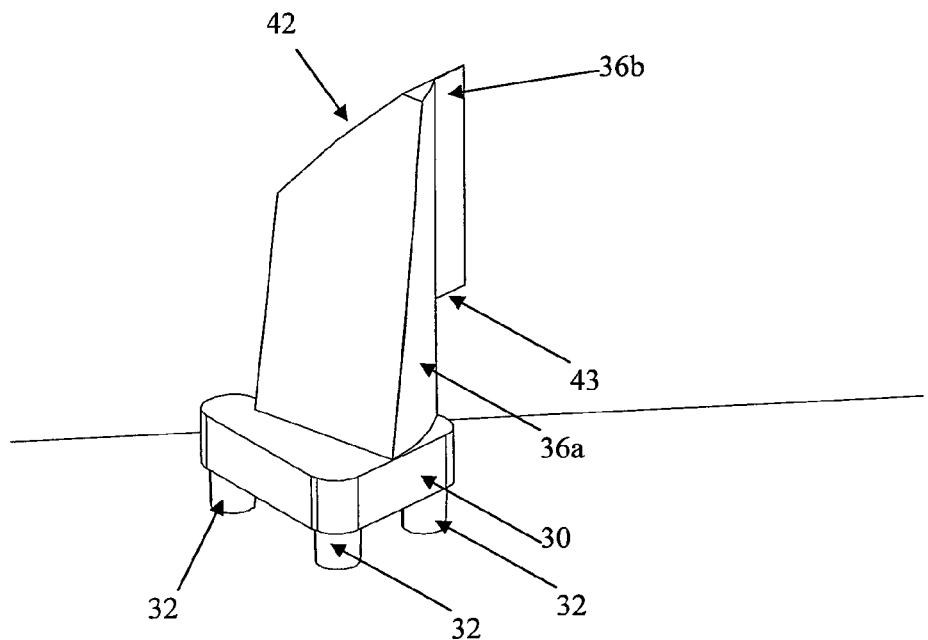
Figure 2C:
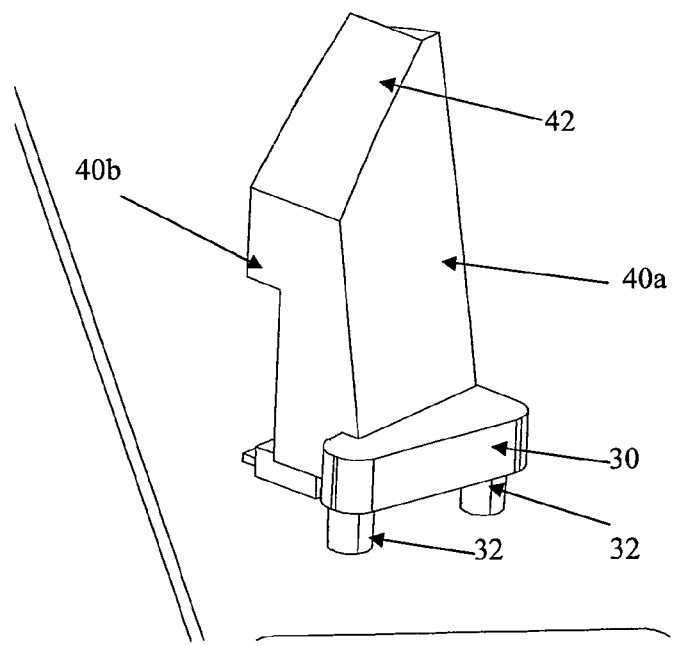

One can see in FIG. 2a that if a light beam impinges on the left portion 40a, it will be reflected to a precisely defined spot 44a and if it impinges on the right portion, it will be reflected to a precisely defined spot 44b. In the arrangement shown in FIG. 2a, the light guide is arranged by means of the legs 32 mounted in holes 34 of the electronic circuit in such a manner that the spot 44b coincides with the sensitive area of photosensor 22. The vacant holes 34 that can be seen in FIG. 1 are in turn arranged in such a manner that if the legs 32 are mounted in these vacant holes, the position of the light guide relative to the circuit board 24 and to the photosensor 22, which is fixedly mounted on the circuit board, will be changed in such a manner that the spot 44a coincides with the light sensitive area of photosensor 22. Hence, it is possible to accommodate two possible orientations of the light guide 20 without changing the position of the photosensor 22. Thereby it is possible to accommodate different polygonal wheels 5 by putting the light guide 20 into different holes 34 without a need to change the position of the photosensor 22 or to exchange the light guide 20 for a different light guide. Accordingly, it is neither necessary to redefine the electric connections in the circuit board nor to provide alternative connections in the circuit board in order to connect photosensor 22 to the rest of the electronic equipment, if another one of a predetermined set of polygonal wheels, which can be mounted in the scanning device shown in FIG. 1, is used. Manufacture is thereby greatly simplified.

Figure 3:
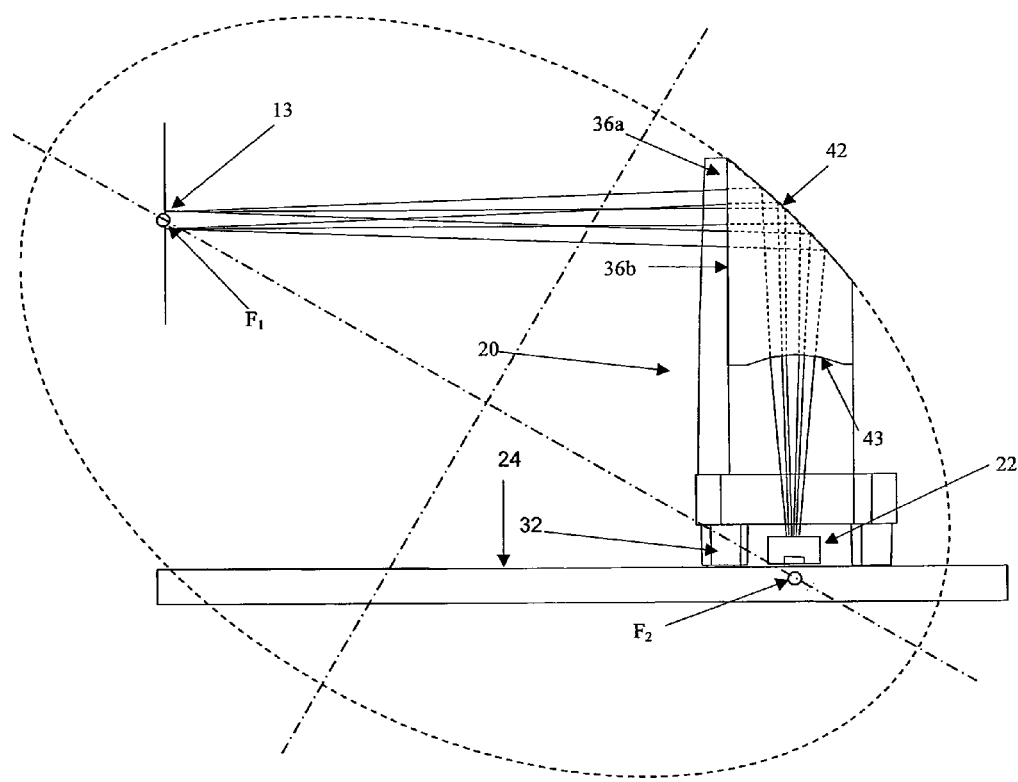
FIG. 3 illustrates the optical principle of the arrangement shown in FIG. 1, FIGS. 4a and 4b illustrate a synchronizing arrangement comprising a second embodiment of a light guide according to the present invention into alternative exemplary configurations.

The optical principle of light guide 20 is illustrated in FIG. 3. The reflecting surface 42 is part of an ellipsoid with two focal points $F_1$ and $F_2$, one of which coincides with or is at least close to the incidence point 13 at the polygonal wheel, when the polygonal wheel is in the position at which the reflected beam is received by the light guide 20 and directed to the photosensor 22. The other focal point coincides with or is at least close to the light sensitive area of the photosensor 22. Hence, all light reflected at the polygonal wheel at the point of incidence and impinging on the light guide 20 will be focused on the photosensor 22. As the point of incidence 13 essentially does not change when the mirror faces 9 are inclined to the rotation axis of polygonal wheel 5 to create a plurality of different scanning lines, the light reflected at each mirror face of the polygonal wheel 5 will ultimately arrive at the photosensor 22. Thus, differently from the prior art cited before, the region on which the light reflected from the polygonal wheel and used for synchronizing purposes is incident, is very small due to the focusing effect of reflecting surface 42 and hence a photosensor with a small sensitive area can be used.

Figure 4A:
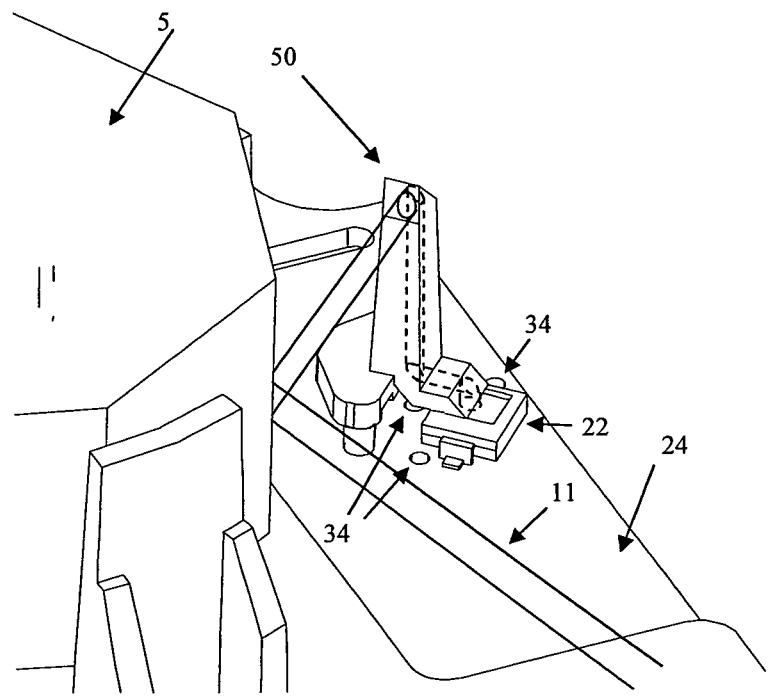
Figure 4B:
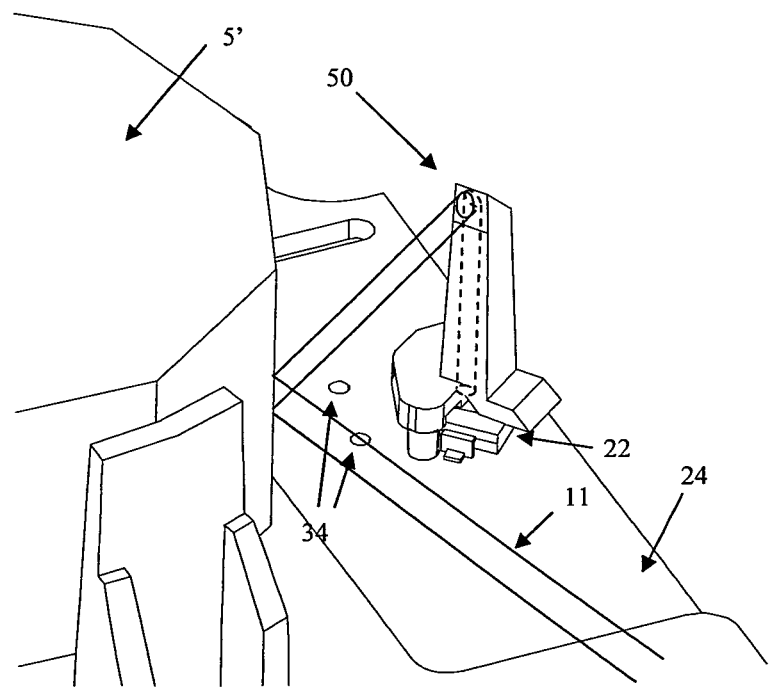
Figure 5:
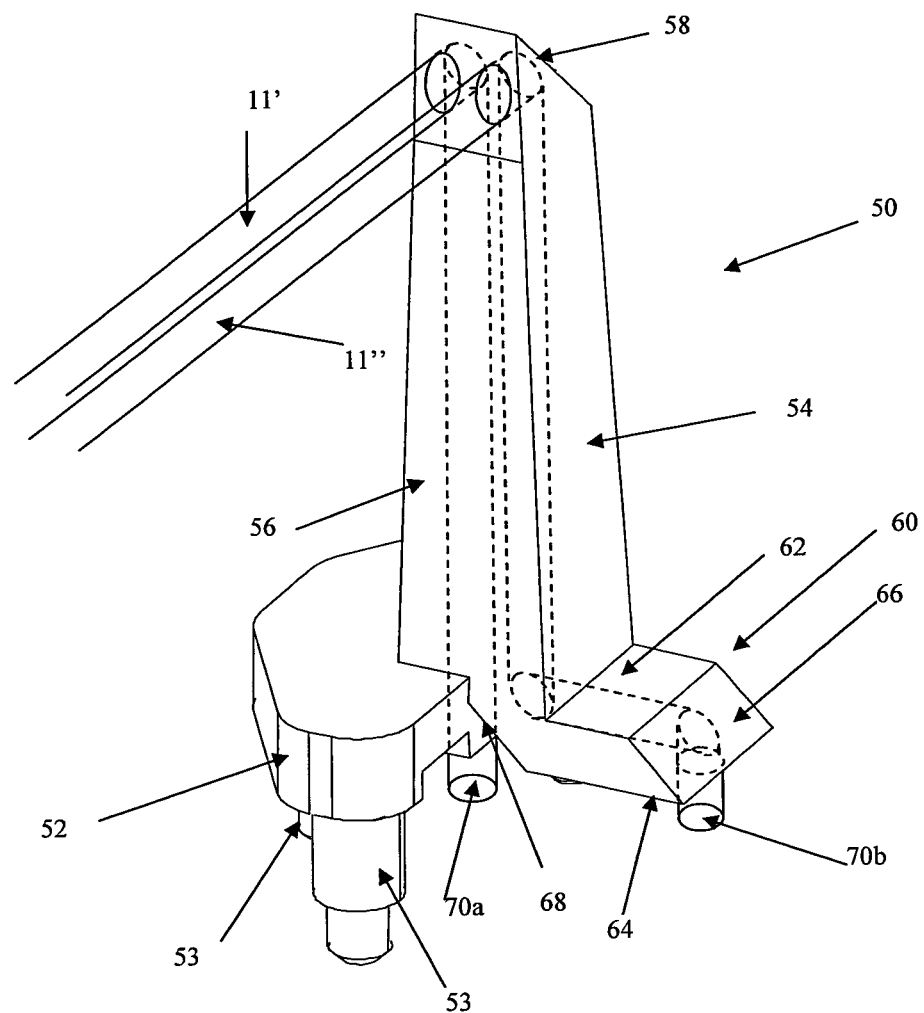
FIG. 5 is a perspective view of light guide according to said second embodiment of the present invention.

FIGS. 4a and 4b show an alternative embodiment of the invention, wherein the basic construction of the scanner shown in FIG. 1 is the same, but the light guide 22 of the embodiment of FIG. 1 has been exchanged for the light guide 50, which is shown in separation in FIG. 5.

Like light guide 20, light guide 50 comprises a transparent base portion 52 with parallel top and bottom surfaces and three legs 53 extending downwards from the bottom surface. The base portion 52 carries the main body 54 of the light guide, which has an obelisk-like shape with a flat front face 56 and a flat reflection face 58, which forms the top face and is tilted with regard to the front face 56 at an angle smaller than 90°. In the embodiment shown in FIGS. 4a and 4b, it meets the front face 56 at a common edge. Alternatively, it may form an edge with another face, which in turn directly or indirectly connects to the front face. The two side faces and the back face are flat, although other shapes can be envisaged. In the embodiment shown in FIGS. 4a, 4b and 5 the front, side and back faces taper from bottom to top, although a constant width over the entire height may be contemplated as well.

The main body 54 only partly rests on the base portion 52 and has a cut-out edge matching the top edge of the base portion 52, so that part of the main body 54 extends below the top surface of the base portion 52. The light guide furthermore comprises a side portion 60 which joins the main body at the side opposite the base portion 52. The side portion has a rectangular top surface 62 and a rectangular bottom surface 64, which are parallel to each other. It furthermore has parallel side surfaces at right angles to the top surface and an oblique end surface 66 at its free end, which joins the top and bottom surfaces at an angle different from 90°, preferably 45°. At its overhanging bottom end the main body has an oblique surface 68 parallel to end surface 66, which extends from the wall of the main body adjacent to the side of the base portion to the bottom surface 64 of the side portion 60.

Light guide 50 defines two distinct light paths, as illustrated in FIG. 5. When a light beam 11' impinges in the left top part of the front face 56, it will be reflected downward by reflection face 58 in a direction about perpendicular to the top surface of the base portion 52, pass the base portion and leave through the bottom surface of the base portion to create a light spot 70a. If the light beam impinges on the right top part of the front face 56, as is illustrated by light beam 11", it will be likewise reflected downward by reflection face 58. It will, however, meet oblique surface 68 and be reflected at this surface to surface 66, where it will be reflected to surface 64, where it will leave light guide 50 downward to create a light spot 70b.

Like with the light guide of the first embodiment, it is possible to accommodate different light paths in a optical code reader, as may become necessary when the polygonal wheel 5 is exchanged, without changing the position of photosensor 20 on circuit board 24. This is illustrated in FIGS. 4a and 4b. In the arrangement of FIG. 4a the light beam 11 impinges on the right side of the front face and is reflected downwards through faces 58, 68 and 66 to photosensor 20, wherein light spot 70b (cf. FIG. 5) corresponds to the light sensitive area of the photosensor. In the arrangement of FIG. 4b, a polygonal wheel 5' with a higher number of mirror faces is used so that the reflected light beam changes. In the arrangement of FIG. 4b, the light impinges on the left side of the front face 56 and is vertically reflected downwards through the base portion 52 to impinge on photosensor 20, wherein the light spot 70a (cf. FIG. 5) created by the reflected light beam 11 comes within the light sensitive area of photosensor 20. Both in FIGS. 4a and 4b one can see empty holes 34 in the electronic circuit board, which define the position and orientation of light guide 50 in the respective other arrangement, when the legs 53 are inserted into these holes 34. Thus, one can change the synchronizing arrangement, consisting of light guide 50 and photosensor 20, from the embodiment of FIG. 4a to that of FIG. 4b by simply taking out light guide 50 and inserting the legs 53 into the appropriate holes 34 prepared in advance in the electronic circuit board without changing the position of the photosensor 20.

Figure 6:
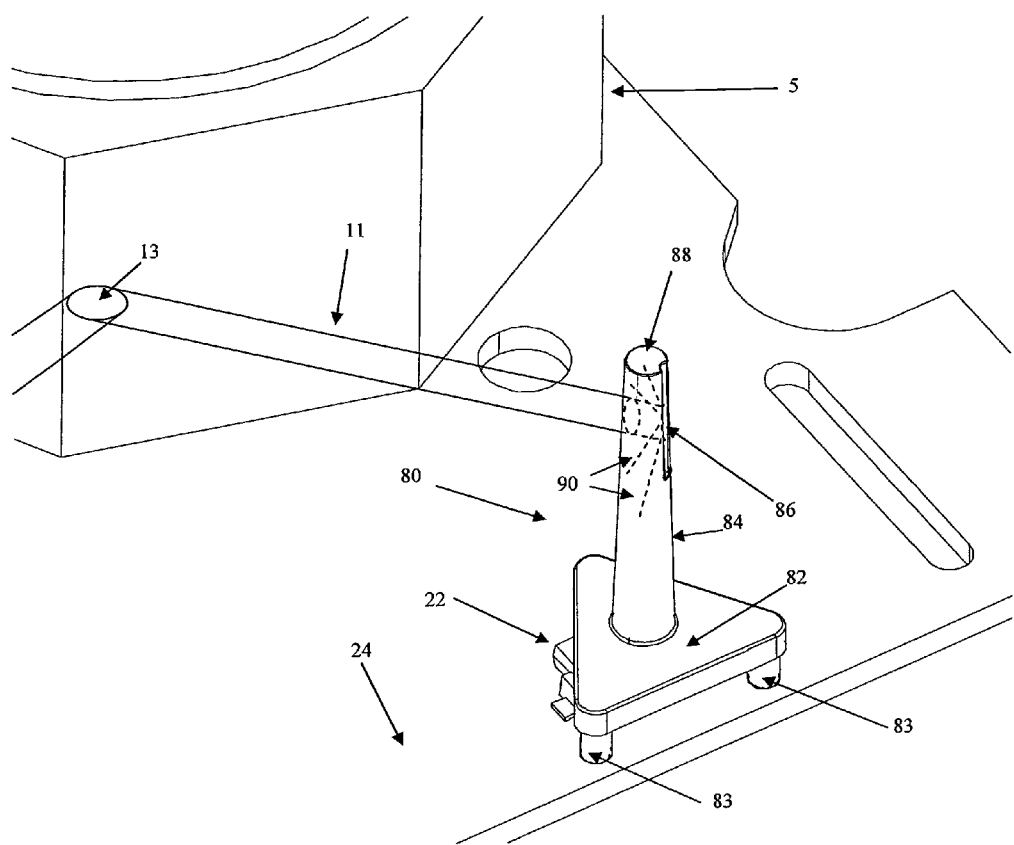
FIG. 6 illustrates a synchronizing arrangement comprising a third embodiment of the light guide according to the present invention.

FIG. 6 shows a further embodiment of a light guide for use in the present invention, which is generally referenced by numeral 80. Like in the other embodiments it comprises a transparent base portion 82 with a top and bottom surface and legs 83 extending from the bottom surface for insertion into holes 34 of circuit board 24. The main body 84 extending upwards from base portion 82 has the shape of a truncated cone, the diameter of which decreases in the direction from the base portion 82 towards its free end. The symmetry axis of this truncated cone is perpendicular to the circuit board 24 in the mounted state and/or to the top surface of base portion 82. At the top of the side of the truncated cone a groove 86 is provided, which extends from top surface 88 of the cone along the side, parallel to the symmetry axis of the cone. The groove is coated or otherwise provided with a material that is opaque to and diffusely reflecting light having the wavelength of the light emitted by light source 1, so as to provide an internally diffusely reflecting strip parallel to the symmetry axis. Alternatively, it may be contemplated omit the groove 86 and to paint a diffusely reflecting strip on the side surface of the truncated cone parallel to its symmetry axis.

In a code reading device of the present invention the symmetry axis of the main body 84 is aligned parallel to the rotation axis of the rotating wheel 5 and/or to the scanning plane or, in case of a plurality of scanning planes, a scanning plane. It is furthermore arranged in such a way that a light beam reflected by the polygonal wheel 5 at the edge of the scanning range will impinge on the light guide at a level corresponding to that of groove 86. When mounted in a scanning device, the groove 86 is located at the side opposite to that at which the reflected light beam 11 impinges. As in the other embodiments, proper alignment and positioning is effected by providing appropriately arranged holes 34 in the circuit board 24 so that, when the legs 82 are inserted into the appropriate holes, the light guide is in the proper position and orientation for a given configuration of the reading device, which may, for example, be defined by the number of reflecting mirror faces at the side of polygon wheel 5.

Light beam 11 impinging near the top of the main body 84 will be focused on the diffusing groove 86 provided on the side opposite to the incidence side due to the convex surface of the main body. The light incident at the sidewall of the cone in the region of groove 86 will be diffusely reflected into the cone, as indicated by light rays 90. The side surface and the top surface of the truncated cone forming main body 84 are smooth and preferably polished so that light travelling inside the light guide and reflected at one of these surfaces outside the region of groove 86 will be reflected at a well-defined angle. A major part of the light diffusely reflected at the reflecting strip formed by groove 86 will be guided along the cone by total internal reflection, pass through base portion 82 and ultimately leave at the bottom of base portion 82. The region where this light exits is opposite the light sensitive area of photosensor 22, which thus detects the light guided by the main body to the bottom of base portion 82. In order to provide a good optical coupling between the sensor and the light guide, an index-matching material, such as an index-matching adhesive, may be provided between the bottom surface of the light guide 80 and the light sensitive area of the photosensor.

As the groove 86 extends over a certain distance and light incident anywhere along the groove will be differently reflected, the light of light beam 11 will be guided to the bottom surface of the cone irrespective of the height at which it is incident on the main body 84 or of the angle of the respective scanning plane to the rotation axis of polygonal wheel. Thus, even if the reflecting mirrors at the side of polygonal wheel are tilted with regard to a plane perpendicular to the axis of rotation of the polygonal wheel, the light of the related light beams 11 will be guided along the light guide 80 to the photosensor 22 and thus a synchronization signal will be generated.

Whereas above the light guides were described to comprise several constituent parts for the ease of explanation, it should be understood that in the preferred embodiment, the light guide is a unitary article and manufactured in one piece, preferably by molding, e.g. by thermoplastic injection molding. Alternatively, it is, of course, also possible to assemble the light guide from a plurality of components, which may be connected by a suitable adhesive, which preferably has the same or a similar refractive index as the components it connects. For example, in the embodiment shown in FIG. 6 the main body 84 of the light guide may be glued on top of the base portion 82 or it may extend through a hole in the base portion to end flush with the bottom surface of base portion 82. In the last-mentioned embodiment, the base portion 82 may only have the function to keep the main body 84 in place and will not have any optical function. As such it does not necessarily have to consist of a light-transmitting material in this specific embodiment.

Generally, the light guide or at least those portions defining the light path of a reflected beam to the photosensor is made of a transparent material with a low level of absorption for the wavelength of the light emitted by light source 1. As mentioned above, in certain other embodiments those parts of the light guide that are not optically relevant may be made of a material other than a light-transmitting material. According to the invention it can be provided that the material of the light guide or at least some of it or of its components is selective for the wavelength of the light emitted from the light source 1, i.e. it transmits light from the light source 1 without significant losses, but attenuates light having a different wavelength. In this way interference by stray light entering the device or by external light sources can be eliminated or at least reduced. As an alternative, the light guide may be combined with a suitable filter eliminating or reducing light with a wavelength different from that of the light beam emitted by light source 1.

The features of the invention disclosed in the specification, the claims and the drawing can be relevant for the realization of the invention and its various embodiments individually or in any combination thereof.

What is claimed is:

1. A light guide for directing a light beam to a photosensor in a scanning system, wherein light is deflected by one or more moving elements in the scanning system into a scanning region,
   wherein said light guide has a light entry region, a reflecting region for reflecting light entering the light entry region and one or more light exit faces, so that light entering the light guide through the light entry region is at least partly reflected in the reflecting region and exits through one of the exit faces, and
   wherein the shape and the properties of the light guide are such that for two pencils of light rays, which enter the light guide through the light entry region and leave the light guide through a respective light exit face in an exit zone, a first of the two pencils of light rays is spaced from the second pencil and is non-overlapping with said second pencil of light rays, the first and second pencils of light rays have identical or at least overlapping exit zones in the same exit face and the light guide comprises a diffusely reflecting region and a protruding portion that has a discrete or continuous rotational symmetry with regard to a central axis, said protruding portion comprising said diffusely reflecting region.

2. The light guide according to claim 1, wherein at least a partial region of the light entry region is curved.

3. The light guide according to claim 1, wherein the protruding portion has the shape of a truncated cone, wherein the diameter of said truncated cone diminishes from bottom to top and the top of said cone forms the top of the light guide, wherein the diffusely reflecting region comprises a diffusely reflecting stripe at the side of the protruding portion, said stripe essentially extending along a plane including the symmetry axis of said truncated cone.

4. The light guide according to one of claim 1, wherein the light guide comprises at least two legs at the bottom thereof for insertion into corresponding holes in an electronic circuit board.

5. A scanning system, comprising at least one light source and light deflection means for consecutively directing light in different directions, the light deflection means comprising at least one moving optical element for receiving light from the light source and directing said light in different directions in accordance with the movement of the element,
   said scanning system further comprising a synchronizing arrangement comprising a light guide according to claim 1 and a photosensor, said light guide being arranged so that when said moving optical element is in a predetermined position, light deflected by said moving optical element is received at the light entry region of said light guide and directed to a light exit face of the light guide, wherein the photosensor is arranged to receive light emerging from said light exit face so as to render an electric signal when said moving optical element is in said predetermined position.

6. The scanning system according to claim 5, wherein at least a partial region of the light entry region of the light guide is curved.

7. The scanning system according to claim 5, wherein the protruding portion has the shape of a truncated cone, wherein the diameter of said truncated cone diminishes from bottom to top and the top of said cone forms the top of the light guide, wherein said diffusely reflecting region comprises a diffusely reflecting stripe at the side of the protruding portion.

8. The scanning system according to claim 7, wherein said diffusely reflecting stripe essentially extends along a plane including a symmetry axis of said truncated cone.

9. The scanning system according to claim 5, wherein the photosensor and the light guide are mounted on an electronic circuit board and the light guide comprises at least two legs which are inserted into mating holes in the electronic circuit board.

10. The scanning system according to claim 5, wherein the light guide comprises at least two legs at the bottom thereof for insertion into corresponding holes in an electronic circuit board.

11. A method of manufacturing a scanning system, comprising the following steps:
   providing at least one light source and light deflection means for consecutively directing light in different directions, the light directing means comprising at least one moving optical element for receiving light from the light source and directing said light in different directions in accordance with the movement of the element, providing a light guide according to claim 1, said light guide having means for mounting it on an electronic circuit board, providing an electronic circuit board, said electronic circuit board comprising means for receiving the light guide in a plurality of positions, mounting a photosensor on said electronic circuit board, and mounting the light guide in a selected one of said positions using said mounting and receiving means, said position being selected such that the light entry region of the light guide receives light deflected from said moving optical element, when said moving optical element is in said predetermined position and the photosensor is located below said light exit face where the light deflected by said moving optical element incident on the light entry region leaves the light guide when the light guide is in said selected position.

12. The method according to claim 11, wherein the light guide comprises at least two legs to be inserted into mating holes of the electronic circuit board, the number of holes in the electronic circuit board being larger than the number of legs of the light guide, the holes in the electronic circuit board being arranged in such a way that there are at least two different groups of holes, each of said groups corresponding to a different position of said light guide, when the legs are inserted into the holes of the respective group, the method comprising the further steps of:

selecting a group of holes defining one of a plurality of positions of the light guide, and inserting the legs of the light guide into the holes of said group, thereby mounting the light guide in said predetermined position.

\* \* \* \* \*